(12) United States Patent
Fridlyand

(10) Patent No.: US 6,555,149 B2
(45) Date of Patent: Apr. 29, 2003

(54) FLAVORED MINERAL WATER FOR PETS

(76) Inventor: Simon Fridlyand, 27 Ellsworth Avenue, Richmond Hill, Ontario (CA), L4C 9N8

( * ) Notice: Subject to any disclaimer, the term of this patent is extended or adjusted under 35 U.S.C. 154(b) by 0 days.

(21) Appl. No.: 09/809,419

(22) Filed: Mar. 16, 2001

(65) Prior Publication Data

US 2002/0009521 A1 Jan. 24, 2002

(51) Int. Cl.⁷ .............................. A23L 2/02; A23K 1/18
(52) U.S. Cl. ........................... 426/66; 426/74; 426/805
(58) Field of Search ............................ 426/66, 74, 805

(56) References Cited

U.S. PATENT DOCUMENTS 5,006,352 A * 4/1991 Zoltai et al. .................. 426/67
5,017,389 A * 5/1991 Green .......................... 426/72
6,248,390 B1 * 6/2001 Stillman ...................... 426/590

FOREIGN PATENT DOCUMENTS

FR        2715539    *   8/1995
WO     95/28854    *   11/1995

* cited by examiner

Primary Examiner—Chhaya D. Sayala

(57) ABSTRACT

A mineral water specifically formulated for pets particularly domestic pets such as dogs cats and birds is described. The mineral water comprises a purified water having less than 200 ppm dissolved minerals and being essentially free of chlorine and containing a small amount of an artificial flavor of a food which is enjoyed by the pet, the flavored mineral water being essentially free of glycerine. As the flavor and older of the mineral water mimics a food enjoyed by the pet, they freely drink the mineral water.

11 Claims, No Drawings

FLAVORED MINERAL WATER FOR PETS

FIELD OF THE INVENTION

The present invention is directed to a flavored mineral water specifically formulated for pets, particularly domestic pets such as dogs, cats and birds.

BACKGROUND OF THE INVENTION

Many animals, especially household pets, such as dogs, cats and birds, require an adequate intake of water in order to maintain optimum health. For some animals, especially cats, it is sometimes difficult to ensure that the animal drinks an adequate supply of water. This is especially true if the animal is being fed a dry pet food. Also, in some cases, the animals may not necessarily enjoy the taste of the water and may not be drinking enough fluid to maintain optimum health.

The quality of the water being consumed may also affect the animals desire to drink as well as potentially affecting the animals overall health. Just as many people do not like the taste of city water, due to the presence of chlorine and residual matter, many animals do not find the water palatable. In some locales, especially in hot weather, the water may have an extremely bad taste due to residual organic matter from contaminating algae and bacteria which have been killed by the chlorine treatment. For these reasons, many people have, in recent years, switched to bottled or natural spring or mineral water to provide a more palatable water for drinking.

There have been attempts to provide alternative water sources for pets including nutritional fluids for pets which are water-based and which contain vitamins, minerals and other nutrients to use is a supplement for or to replace the drinking water for the pet. Examples of such nutritional drinks for pets are described in U.S. Pat. No. 5,017,389 and PCT Application No. WO 95/28854.

U.S. Pat. No. 5,017,389, issued May 21, 1991, to Green describes a nutritional drink formulated for dogs and other animals containing dextrose, glycine, electrolytes, vitamins and minerals in a buffered pH 7 solution. The nutritional drink is designed to supplement the animal's normal source of nutrition, especially for active dogs and others having increased metabolic rates such as dogs in gestation.

PCT Application No. WO 95/28854 published Nov. 2, 1995, by Duke et al describes a purified drinking water for pets having a tartness and palatability enhancer used to adjust the pH below 5.5. The drinking water preferably also contains sugars, flavoring agents, vitamins, amino acids, electrolytes and minerals.

However for both of the above formulations, the additional nutritional supplements provided by the prior art formulations are unnecessary and increase the cost of the nutritional fluids such that many pet owners may not partake of these fluids.

There thus still remains a need for a pure water source for pets which is palatable to the pet and provides a healthy source of the required daily amount of fluids to the pets.

SUMMARY OF THE INVENTION

The present invention is directed to a flavored mineral water specifically formulated for pets, particularly domestic pets, such as dogs cats and birds. The mineral water comprises a purified water having less than 200 ppm dissolved minerals and being essentially free of chlorine and containing a small amount of an artificial flavor of a food which is enjoyed by the pet, the flavored mineral water being essentially free of glycerine. As the flavor and odor of the flavored mineral water mimics a food enjoyed by the pet, they freely drink the flavored mineral water.

In an aspect of the invention the flavored mineral water is formulated for dogs and contains an artificial beef or lamb flavor.

In another aspect of the invention the flavored mineral water is formulated for cats and contains an artificial fish, chicken, turkey or liver flavor.

In yet another aspect of the invention the flavored mineral water is formulated for birds and contains an artificial apple flavor.

DETAILED DESCRIPTION OF THE PREFERRED EMBODIMENTS

The present invention provides for a flavored mineral water specifically formulated for pets, particularly domestic pets such as dogs, cats and birds. The flavor and odor of the flavored mineral water mimics a food enjoyed by the pet and thus the pet freely drinks the mineral water. The flavored mineral water enhances the health of the pet by providing a clean and pure source of water for the pet which is tasty for the pet and contains the proper amounts of minerals.

The flavored mineral water of the present invention utilizes a purified water source for the formulation. Preferably the purified water source is distilled water or water purified by reverse osmosis. The water utilized in formulating the flavored mineral water of the present invention should have a total mineral content of less than 200 ppm and should be chlorine free. The presence of higher amounts of minerals and chlorine in the water makes the water less palatable to the pets and should be avoided.

The water used to formulate the flavored mineral water of the present invention is a purified water having less than 200 ppm dissolved minerals and being essentially free of chlorine. The source of the water could be a spring or other natural source having the low levels of dissolved minerals and being essentially free of chlorine or it may be provided by purifying a less suitable source of water such as City water to the desired levels of minerals and chlorine. The purified water is preferably prepared by using City water and then steam distilling or passing the water through suitable filters including a reverse osmosis filter. The process of purifying the water by this step significantly reduces the amount of dissolved minerals and chlorine to the desired levels.

The flavored mineral water of the present invention includes a artificial flavoring which mimics a food enjoyed by the pet. Flavored mineral water formulated for dogs generally contains an artificial beef or lamb flavor while flavored mineral waters formulated for cats will generally contain an artificial fish, chicken, turkey or liver flavor. For birds, the flavored mineral water is formulated to contain an apple artificial flavor. The amount of the flavoring agents added to the mineral water should be sufficient to provide an adequate level of olfactory stimulus to the animal but not so much as to overpower the animal. For many of the commercially available artificial flavors this will generally be between about 15 and 30 ppm of the concentrated artificial flavor with a preferred level being approximately 20 ppm. This range may vary however depending upon the concentration of the flavoring agents provided by the manufacturer.

While many of the commercially available flavoring agents contain glycerin, the presence of glycerin in the flavored mineral water of the present invention should be avoided. A flavored mineral water essentially free of glycerin has been found to be more palatable to the pets and increases the liklihood of the pet ingesting an adequate amount of the water for their daily requirements. By eliminating glycerin, the clarity of the water is also improved as there are reduced organic materials and no film or residue which is observed with waters containing glycerin.

In addition to the flavoring agents, the flavored mineral water of the present invention may also contain certain essential minerals for the animals health. For example, for dogs, the mineral water may contain phosphorus in an amount of approximately 50 ppm while for cats the mineral water may contain phosphorus at about 50 ppm, calcium at about 50 ppm and Valerian tincture at about 20 ppm.

To provide the adequate levels of phosphorous a soluble phosphorous containing compound is utilized. The phosporous containing compound is preferably a phosporous containing salt such as calcium phosphate, sodium pyrophosphate, sodium acid pyrophosphate, sodium polyphosphate, and tetrasodium pyrophosphate among others. The preferred phosphorous containing compound is selected from calcium phosphate, sodium pyrophosphate and sodium acid pyrophosphate. The use of calcium phosphate also provides the proper level of calcium in the water.

The pH of the flavoured mineral water is preferably between about 6 to about 8. Most preferably, the pH of the flavoured mineral water is neutral, about 7.

It has been found that as the flavored mineral water of the present invention has a minimal amount of carbohydrates and other organic materials, they are not capable of supporting growth of bacteria and other microbial contaminants. The only organic material in the mineral water is the amount present in the artifical flavor which is added to the water at the extremely low concentration of 15 to 30 ppm. Thus it has been found that the use of perservatives is not necessary for the flavored mineral water of the present invention. The absence of preservatives makes the water more palatable to the pets as several of the commonly used perservative have an aftertaste.

The flavored mineral water of the present invention is formulated by adding the artifical flavor to the purified water and mixing. The phosphorous containing compound and optionally the magnesium containing compound and valerian tincture are then added, the water mixed, the pH adjusted if required and dispensed into suitable containers.

The following examples illustrate preferred embodiments of the flavored mineral water of the present invention but the invention is not intended to be limited to the specific examples.

EXAMPLE 1

A flavored mineral water for dogs was formulated by first purifying City Water by reverse osmosis to provide a water having a total mineral content of less than 200 ppm and being essentially free of chlorine. To ten liters of this water was added sodium acid pyrophosphate to give a final phosphorus content of 50 ppm and 200 ml of an artifical beef type flavor provided by Aromatic & Flavors Inc. of Scarborough, Ont under the catalog number 6951-7252. The flavored mineral water was dispensed into one liter plastic containers.

EXAMPLE 2

A flavored mineral water for cats was formulated using City water purified by reverse osmosis to remove chlorine and to reduce mineral content to less than 200 ppm. To ten liters of this water was added calcium phosphate to give a final phosphorus content of 50 ppm and a calcium content of 50 ppm and 200 ml of a artificial fish flavor provided by Aromatics & Flavors Inc. under the catalog number 6951-6667. The flavored mineral water was dispensed into one liter plastic containers.

The flavored mineral water of the present invention is utilized as a supplement to or a replacement for the regular drinking water for the pet. Preferably, for consistency, the flavored mineral water of the present invention is utilized as a replacement for the regular drinking water. The flavored mineral water of the present invention is preferably provided to the pet ad libitum to allow them to drink the amount of water to match their daily requirement. It has been found that a typical domestic cat will drink about 200 ml of the flavored mineral water per day while a typical medium sized dog will drink about 500 ml per day. These amounts or amounts slightly in excess would be provided daily to the animal.

The flavored mineral water of the present invention provides numerous advantages over both the use of tap water as well as the use of the formulated waters of the prior art. The flavored mineral water of the present invention provides a purer source of water for the pets than tap water while also being more palatable as it has a flavor of a food which is enjoyed by the pet. The flavored mineral water of the present invention is a simpler formulation than those of the prior art, thus rendering it easier to manufacture and less expensive for the consumer. The prior art formulations have a number of unnecessary ingredients duplicating the nutritional components already provided in adequate amounts in the pet food. These extra ingredients make the prior art formulations more expensive and require more steps to manufacture than the flavored mineral water of the present invention. Additionally, because of the presence of organic based ingedients in the prior art formulations, the prior art formulations may not have the appearance of pure water, but may have a slighly cloudy appearance. Also, because of the inclusion of ingredients such as sugars and other carbohydrates, the prior art formulations may support microbial growth and thus require the addition of a suitable preservative.

While various preferred embodiments of the present invention have been described herein in detail, it will be appreciated by those of skill in the art that variations may be made thereto without departing from the spirit of the invention or the scope of the appended claims.

The embodiments of the invention in which an exclusive property or privilege is claimed are as follows:

1. A flavored mineral water specifically formulated for dogs cats and birds, the mineral water comprising a purified water having less than 200 ppm dissolved minerals and being essentially free of chlorine and containing a small amount of an artificial flavor of a food which is enjoyed by the dog, cat or bird the flavored mineral water being essentially free of glycerine and having a pH of between 6 and 8.

2. A flavored mineral water of claim 1 wherein the mineral water is formulated for dogs and contains an artificial beef or lamb flavor.

3. A flavored mineral water of claim 2 wherein the artificial lamb or beef flavor is present in an amount of from about 15 ppm to about 30 ppm.

4. A flavored mineral water of claim 3 wherein the mineral water further includes about 50 ppm phosphorous.

5. A flavored mineral water of claim 4 wherein the mineral water contains an artificial beef flavor in an amount of about 20 ppm.

6. A flavored mineral water of claim 1 wherein the mineral water is formulated for cats and contains an artificial fish, chicken, turkey or liver flavor.

7. A flavored mineral water of claim 2 wherein the artificial flavor is present in an amount of from about 15 ppm to about 30 ppm.

8. A flavored mineral water of claim 3 wherein the mineral water further includes about 50 ppm phosphorous.

9. A flavored mineral water of claim 8 wherein the mineral water further includes about 50 ppm calcium.

10. A flavored mineral water of claim 9 wherein the mineral water contains an artificial fish flavor in an amount of about 20 ppm.

11. A flavored mineral water of claim 1 wherein the mineral water is formulated for birds and contains about 20 ppm artificial apple flavor.

* * * * *